United States Patent
Chen et al.

(10) Patent No.: US 8,035,725 B2
(45) Date of Patent: Oct. 11, 2011

(54) MULTI-FOCUS CAMERA APPARATUS AND IMAGE PROCESSING METHOD AND PROGRAM USED THEREIN

(75) Inventors: Tao Chen, Kanagawa-ken (JP); Yasunori Tanaka, Saitama (JP)

(73) Assignee: Fujinon Corporation, Saitama (JP)

( * ) Notice: Subject to any disclaimer, the term of this patent is extended or adjusted under 35 U.S.C. 154(b) by 436 days.

(21) Appl. No.: 12/366,030

(22) Filed: Feb. 5, 2009

(65) Prior Publication Data

US 2009/0195666 A1 Aug. 6, 2009

(30) Foreign Application Priority Data

Feb. 6, 2008 (JP) ................................. 2008-025972

(51) Int. Cl.
*H04N 5/225* (2006.01)
*H04N 5/232* (2006.01)
*G02B 13/00* (2006.01)

(52) U.S. Cl. ..................... 348/349; 348/218.1; 348/353; 348/239

(58) Field of Classification Search ............... 348/218.1, 348/239, 349, 345, 350, 353, 354, 355, 356
See application file for complete search history.

(56) References Cited

U.S. PATENT DOCUMENTS

| | | | | |
|---|---|---|---|---|
| 6,320,979 | B1 * | 11/2001 | Melen | 382/154 |
| 6,646,687 | B1 * | 11/2003 | Vlahos | 348/239 |
| 6,940,555 | B2 * | 9/2005 | Okisu et al. | 348/349 |
| 7,657,171 | B2 * | 2/2010 | Sundstrom | 348/345 |
| 7,680,411 | B2 * | 3/2010 | Ye | 396/334 |
| 2004/0081338 | A1 | 4/2004 | Takenaka | |
| 2005/0270387 | A1 * | 12/2005 | Watanabe et al. | 348/345 |
| 2006/0098256 | A1 | 5/2006 | Kameyama | |
| 2006/0098970 | A1 * | 5/2006 | Sato | 396/121 |
| 2007/0286520 | A1 | 12/2007 | Zhang et al. | |
| 2009/0021600 | A1 * | 1/2009 | Watanabe | 348/340 |
| 2009/0096897 | A1 * | 4/2009 | Saito | 348/241 |
| 2009/0109304 | A1 * | 4/2009 | Guan | 348/240.99 |
| 2010/0265346 | A1 * | 10/2010 | Iizuka | 348/218.1 |

FOREIGN PATENT DOCUMENTS

| | | |
|---|---|---|
| EP | 1 388 802 A2 | 2/2004 |
| JP | 2004-62604 A | 2/2004 |
| JP | 2005-208732 A | 8/2005 |
| JP | 2007282152 A * | 10/2007 |
| WO | WO-02/073535 A2 | 9/2002 |
| WO | WO 2009073950 A1 * | 6/2009 |

OTHER PUBLICATIONS

Li et al., "A Real-Time 3D Human Body Tracking and Modeling System", Image Processing, pp. 2809-2812, IEEE International Conference On, IEEE, PI, Oct. 1, 2006, XP031049260.

Hiura et al., "Depth Measurement by the Multi-Focus Camera", Computer Vision and Pattern Recognition, pp. 953-959, Proceedings, IEEE Computer Society Conference on Santa Barbara, CA, Los Alamitos, CA, Jun. 23-25, 1998, XP010291663.

* cited by examiner

*Primary Examiner* — John Villecco
(74) *Attorney, Agent, or Firm* — Birch, Stewart, Kolasch & Birch, LLP (57) ABSTRACT

In a multi-focus camera apparatus that photographs the same region with cameras having different focal lengths, detection means for detecting a specified target in images obtained by the cameras, region acquisition means for obtaining in the images regions comprising pixels having substantially the same relationships between blurriness degrees as relationships between blurriness degrees of the specified target having been detected in the respective images, and image processing means for carrying out image processing to display the obtained regions differently from other regions are included.

9 Claims, 9 Drawing Sheets

MULTI-FOCUS CAMERA APPARATUS AND IMAGE PROCESSING METHOD AND PROGRAM USED THEREIN

BACKGROUND OF THE INVENTION

1. Field of the Invention

The present invention relates to a multi-focus camera apparatus that photographs the same region by a plurality of cameras having different focal lengths, and to an image processing method and an image processing program used therein.

2. Description of the Related Art

In images photographed for broadcasting or monitoring, methods for protecting personal information by mosaic processing on target objects such as people, pets like dogs and cats, and vehicles have been used. In addition, techniques using image data encryption to prevent image viewing by a third person have been known.

In methods using such mosaic processing or the like, detection of regions representing target objects in photographed images is especially necessary.

As a method of detecting a target object in an image, various kinds of known methods have been used. For example, International Patent Publication No. WO02/073535 describes a method of detecting a region of a target object representing visual information for car navigation such as a road sign and an address in images photographed by a plurality of cameras having different focal lengths installed in a vehicle, through pattern recognition according to an artificial intelligence algorithm.

However, in the above-described method according to pattern recognition, the detection performance unfortunately tends to deteriorate due to a change in a photography condition and a movement of a subject, for example. Consequently, a protection target object may happen to be displayed without mosaic processing thereon, due to failure of detection of a portion or even a whole of the target object. Therefore, appropriate protection of personal information is not achieved in some cases.

SUMMARY OF THE INVENTION

The present invention has been conceived based on consideration of the above circumstances. An object of the present invention is therefore to provide a multi-focus camera apparatus that enables display of a whole target object region in a manner different from other regions in an image, and an image processing method and an image processing program used therein.

A multi-focus camera apparatus of the present invention is a multi-focus camera apparatus that photographs the same region by a plurality of cameras having different focal lengths, and the camera apparatus comprises:

detection means for detecting a specified target in a plurality of images photographed by the cameras;

region acquisition means for obtaining, in the respective images, regions comprising pixels having substantially the same relationships between blurriness degrees as relationships between blurriness degrees regarding the specified target in the respective images detected by the detection means; and image processing means for carrying out image processing to cause the regions obtained by the region acquisition means to be displayed differently from other regions.

In the camera apparatus described above, the blurriness degree regarding the specified target in each of the images may be estimated from a blurriness degree of the specified target in at least two immediately preceding images photographed serially by a corresponding one of the cameras.

The image processing may be at least one of region fill processing, mosaic processing, and template insertion processing.

An image processing method of the present invention is an image processing method for displaying the same region photographed by a plurality of cameras having different focal lengths constituting a multi-focus camera apparatus. The method comprises the steps of:

detecting a specified target in a plurality of images photographed by the cameras;

obtaining, in the respective images, regions comprising pixels having substantially the same relationships between blurriness degrees as relationships between blurriness degrees regarding the specified target detected in the respective images; and carrying out image processing to cause the obtained regions to be displayed differently from other regions.

In the image processing method described above, the blurriness degree regarding the specified target in each of the images may be estimated from a degree of blurriness of the specified target in at least two immediately preceding images photographed serially by a corresponding one of the cameras.

The image processing may be at least one of region fill processing, mosaic processing, and template insertion processing.

A program of the present invention is a program for displaying the same region photographed by a plurality of cameras having different focal lengths constituting a multi-focus camera apparatus. The program causes a computer to execute the procedures of:

detecting a specified target in a plurality of images photographed by the cameras;

obtaining, in the respective images, regions comprising pixels having substantially the same relationships between blurriness degrees as relationships between blurriness degrees regarding the specified target detected in the respective images; and carrying out image processing to cause the obtained regions to be displayed differently from other regions.

The specified target refers to at least a portion of a target object to be displayed differently from other subjects, such as at least a portion of a person, a pet like a dog and a cat, and a vehicle.

Displaying the obtained regions in the manner different from other regions refers to the processing that reduces visibility of either the obtained regions or regions other than the obtained regions by altering or eliminating a whole or a portion of image information thereof, through masking processing such as region fill processing, mosaic processing, and template insertion processing.

Detection of the specified target in the images widely includes the processing for obtaining the specified target in each of the images. Therefore, the detection includes not only the case of obtaining the specified target by detecting the specified target in each of the images but also the case where the specified target is detected in at least one of the images and the specified target is thereafter obtained in the remaining images based on a result of the detection in the image or images, for example.

The pixels having substantially the same relationships between the blurriness degrees as the relationships between the blurriness degrees regarding the specified target in the respective images refer to pixels representing the same subject in the images and constituting the regions wherein a ratio of the blurriness degrees varies within a predetermined range from a ratio of the blurriness degrees of the specified target in the respective images. In other words, the pixels refer to pixels representing a subject in a predetermined distance range from the distance of the specified target from the respective cameras. The respective cameras of the multi-focus camera apparatus are installed closely to each other so as to maintain substantially the same distance to a subject.

The degree of blurriness becomes minimal at each of pixels in each of the images photographed by the cameras when the distance of a subject from a corresponding one of the cameras agrees with the in-focus distance of the camera, and increases gradually as the distance from the in-focus distance increases. In other words, the degree of blurriness at each of the pixels changes in accordance with the distance of a subject from each of the cameras.

Therefore, the predetermined distance range described above refers to a range wherein the target object to be displayed differently from other subjects is wholly included. It is preferable for a size of the distance range to be determined according to a size of the target object. The predetermined range of the blurriness degrees described above is determined to correspond to the predetermined distance range.

According to the multi-focus camera apparatus of the present invention and the image processing method and program used therein, the specified target is detected in each of the images photographed by the cameras having the different focal lengths in the camera apparatus that photographs the same region, and the regions comprising the pixels having substantially the same relationships between the blurriness degrees as the relationships between the blurriness degrees regarding the specified target detected in the respective images is obtained in the respective photographed images. The regions obtained in this manner are subjected to the image processing to be displayed differently from other regions. Therefore, the region of the subject in the distance range that wholly includes the target object can be obtained from the result of detection of at least a portion of the target object to be displayed differently from other subjects. Consequently, the whole region of the target object can be displayed differently from other regions in the images.

In addition, if the degree of blurriness of the specified target in each of the images is the degree of blurriness estimated from the degree of blurriness of the specified target in at least two immediately preceding images photographed serially by the corresponding one of the cameras, the region of the subject in the distance range wherein the whole target object is highly likely to be included can be displayed differently from other regions even in the case where the specified target has not been detected occasionally.

Moreover, in the case where the image processing including at least one of region fill processing, mosaic processing, and template insertion processing is carried out on either the whole target object region or other regions to be protected in each of the images, personal information can be protected appropriately.

DESCRIPTION OF THE PREFERRED EMBODIMENT

Figure 1:
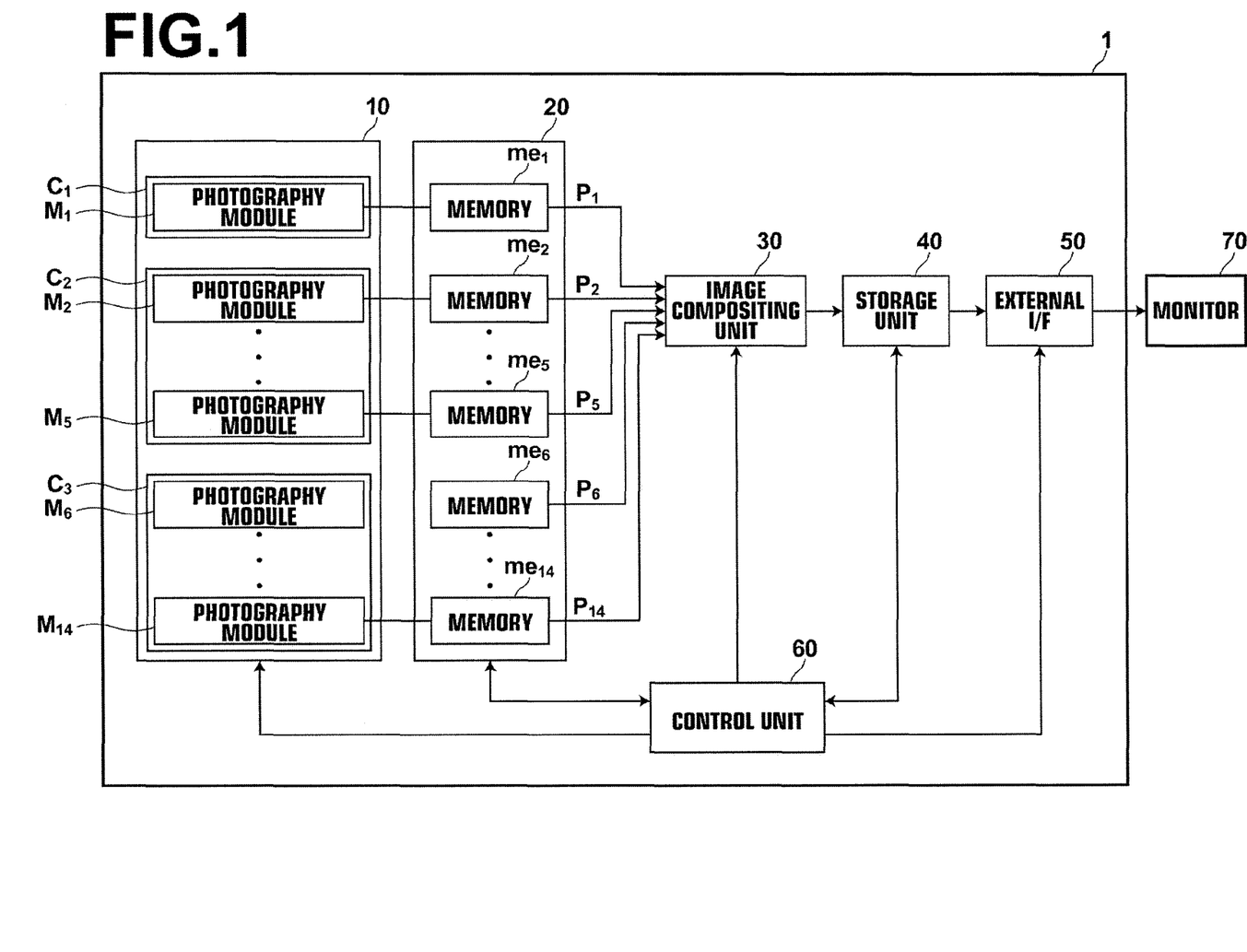
FIG. 1 is a block diagram showing the configuration of a multi-focus camera apparatus of an embodiment of the present invention.
Figure 2:
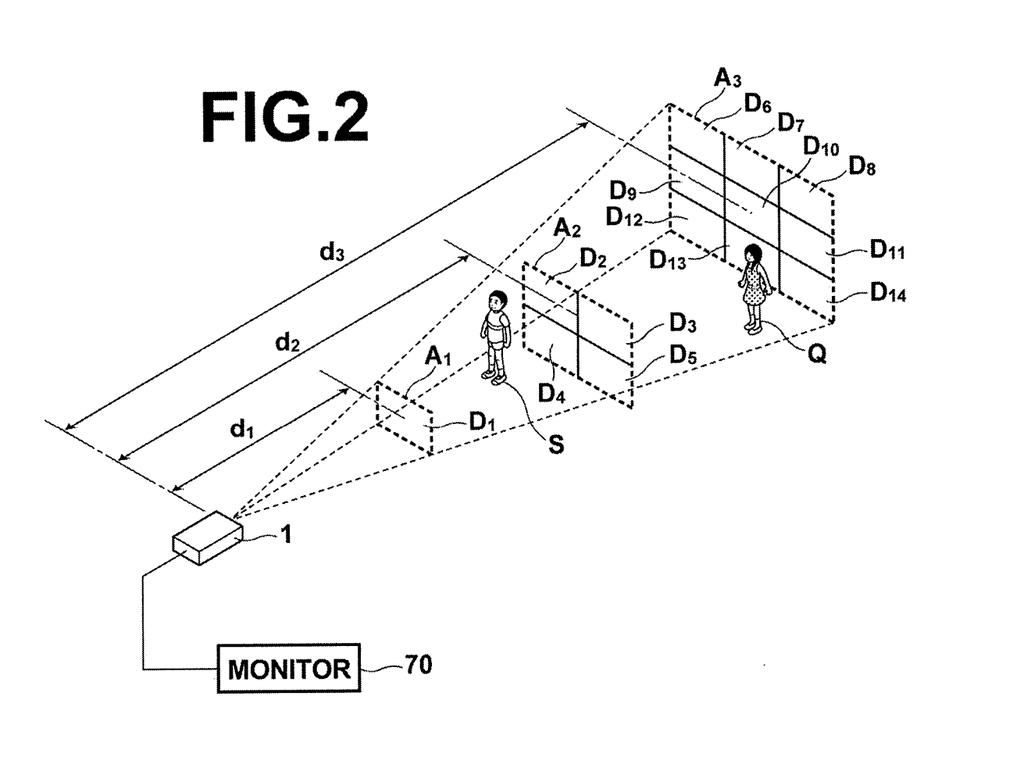
FIG. 2 is a schematic view showing a region photographed by the multi-focus camera apparatus of FIG. 1.
Figure 3A:
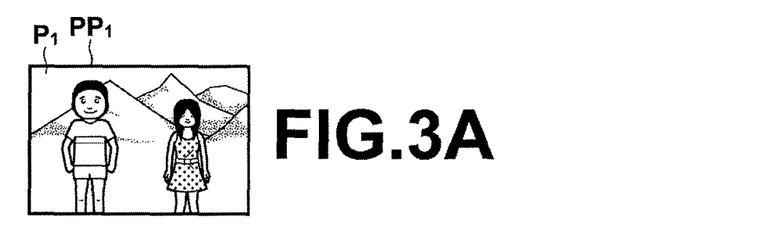
FIGS. 3A to 3C respectively show examples of images obtained by photography by the multi-focus camera apparatus of FIG. 1.
Figure 3B:
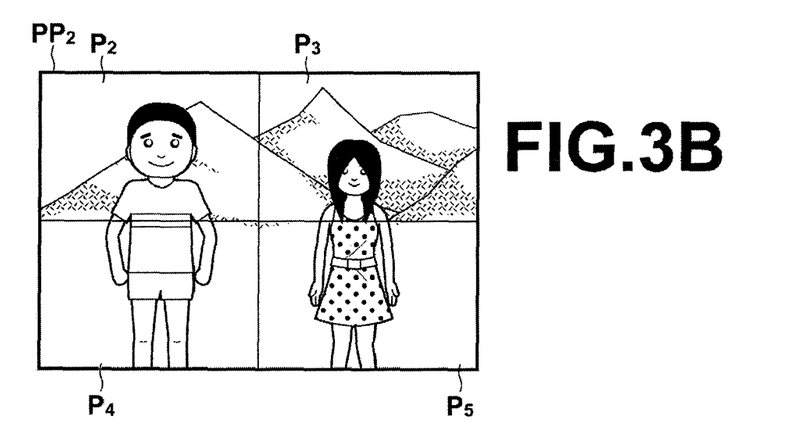
Figure 3C:
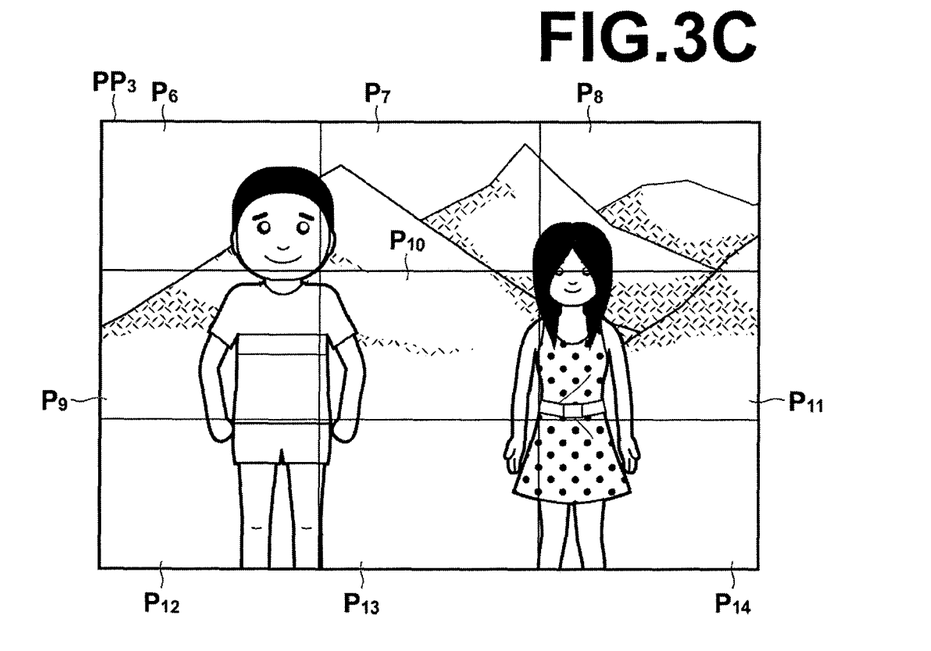

Hereinafter, an embodiment of the present invention will be described with reference to the accompanying drawings. FIG. 1 is a block diagram showing the configuration of a multi-focus camera apparatus 1 of the embodiment of the present invention. FIG. 2 is a schematic view showing a region photographed by the multi-focus camera apparatus 1 in FIG. 1. FIGS. 3A to 3C respectively show examples of images obtained by the camera apparatus 1 in FIG. 1.

As shown in FIG. 1, the multi-focus camera apparatus 1 comprises a photography unit 10, a temporary storage unit 20, an image compositing unit 30, a storage unit 40, and a control unit 60. The photography unit 10 comprises three cameras $C_1$, $C_2$, and $C_3$ having different focal lengths and each comprising at least one of photography modules $M_1$ to $M_{14}$. The temporary storage unit 20 stores images $P_1$ to $P_{14}$ photographed respectively by the photography modules $M_1$ to $M_{14}$ in the photography unit 10. The image compositing unit 30 carries out selection from the images $P_1$ to $P_{14}$, composites the selected images, and generates an output image I by carrying out image processing for displaying a whole region of a target object, which is supposed to be displayed differently from other subjects in the images, differently from other regions. The storage unit 40 stores the image I generated by the image compositing unit 30. The control unit 60 controls each unit in the multi-focus camera apparatus 1. The storage unit 40 is connected to a monitor 70 serving as a display device, via an external interface 50.

The photography unit 10 photographs regions $A_1$, $A_2$, and $A_3$ by the respective cameras $C_1$, $C_2$, and $C_3$ having the different focal lengths, and distances to the regions $A_1$, $A_2$, and $A_3$ are denoted by $d_1$, $d_2$, and $d_3$ in a space included in a field of view, as shown in FIG. 2. Each of the cameras $C_1$, $C_2$, and $C_3$ has the photography module or modules M. The longer the focal length of each of the cameras is, the narrower a field of view of the module or modules constituting the camera is. Therefore, the whole field of view of the camera apparatus is divided and assigned to the modules for photography.

More specifically, the camera $C_1$ has one module $M_1$, while the camera $C_2$ has four modules $M_2$ to $M_5$. The camera $C_3$ has nine modules $M_6$ to $M_{14}$. The photography modules $M_1$ to $M_{14}$ respectively output the images $P_1$ to $P_{14}$ of the same size, as shown in FIG. 3.

The modules $M_1$ to $M_{14}$ carry out photography at a synchronized timing according to a clock signal or the like generated by the control unit 60, for example.

Figure 4:
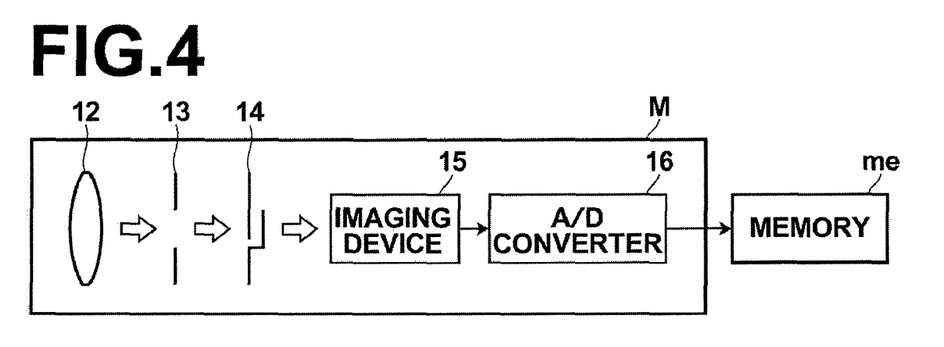
FIG. 4 shows an example of the configuration of a photography module in FIG. 1.

Hereinafter, the configuration of each of the modules M will be described. FIG. 4 shows an example of the configuration.

An optical system of each of the photography modules M comprises an imaging lens unit 12 having a predetermined one of the focal lengths, and an iris 13 and a shutter 14 for adjusting exposure of an image obtained by photography. The diameter of the iris and the closing of the shutter are respectively controlled by iris value data and shutter speed data outputted from the control unit 60 that will be described later. The configuration of the imaging lens unit 12 varies among the modules M, depending on the focal length thereof.

At the rear of the optical system, an imaging device 15 such as a CCD and an A/D converter 16 are disposed. A light from a subject having passed through the optical system is subjected to photoelectric conversion by the imaging device such as a CCD, and an analog image signal obtained in this manner is converted into a digital image signal by the A/D converter 16. The digital image signal is then outputted to a corresponding one of memories $me_1$ to $me_{14}$.

The temporary storage unit 20 has the memories $me_1$ to $me_{14}$ of the same quantity as the photography modules $M_1$ to $M_{14}$ corresponding thereto. The temporary storage unit 20 can serially obtain and store image data from the respective modules $M_1$ to $M_{14}$, at the same time in parallel. The temporary storage unit 20 in this case has the memories $me_1$ to $me_{14}$ corresponding one to one to the modules $M_1$ to $M_{14}$, which is not necessarily limited thereto. One memory may correspond to two or more of the photography modules.

The memories $me_1$ to $me_{14}$ in the temporary storage unit 20 sequentially and temporarily store the digital data of the photographed images outputted by the respective photography modules connected thereto. Each of the memories $me_1$ to $me_{14}$ may comprise a semiconductor memory such as an SRAM or DRAM, or a combination thereof, for example.

Figure 5:
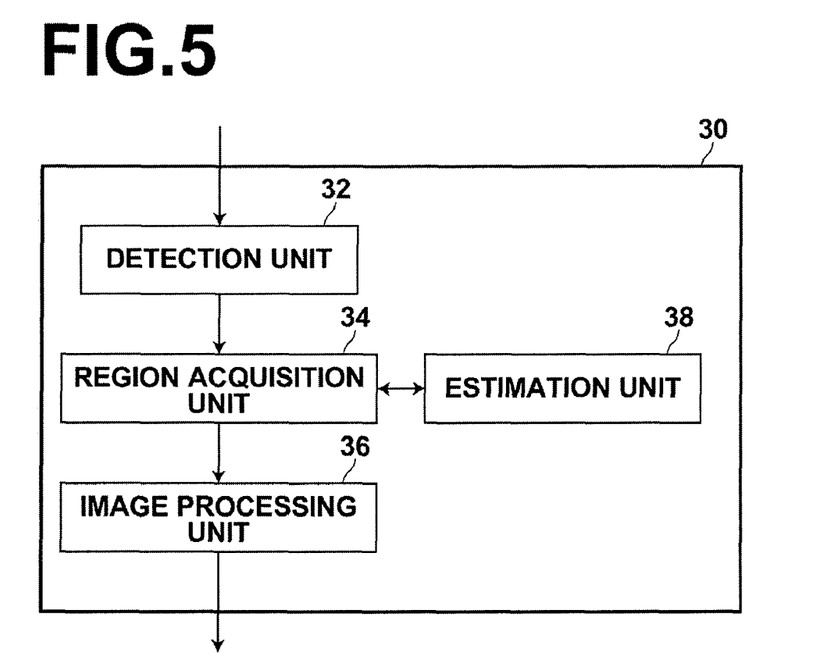
FIG. 5 shows the configuration of an image compositing unit in FIG. 1.

FIG. 5 shows the configuration of the image compositing unit 30. The image compositing unit 30 is connected to all the memories $me_1$ to $me_{14}$ of the temporary storage unit 20, and reads from the memories $me_1$ to $me_{14}$ the images $P_1$ to $P_{14}$ photographed by the respective modules $M_1$ to $M_{14}$. The image compositing unit 30 carries out selection from the images, and composites the selected images. In addition, the image compositing unit 30 generates the output image I by carrying out image processing for displaying a whole region of a target object, which is to be displayed differently from other subjects in each of the images, in a manner different from other regions. The image compositing unit 30 comprises a detection unit 32, a region acquisition unit 34, an image processing unit 36, and an estimation unit 38.

Figure 6A:
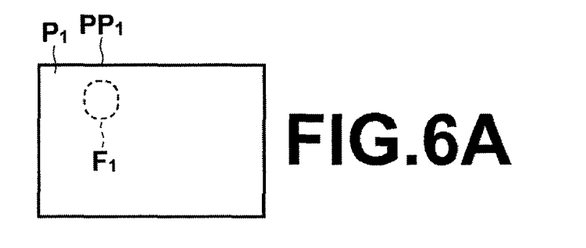
FIGS. 6A to 6C respectively show exemplary results of detection by a detection unit regarding regions representing a specified target in the respective images.
Figure 6B:
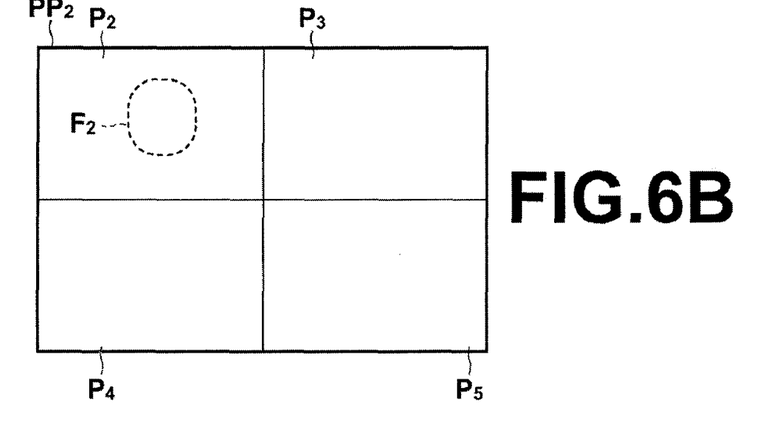
Figure 6C:
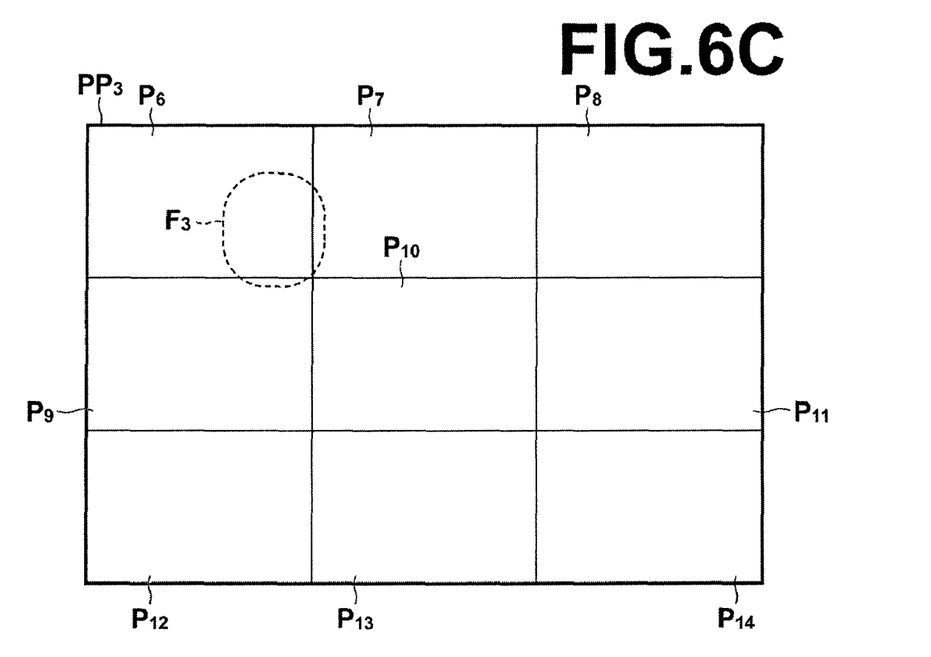

The detection unit 32 detects regions $F_1$, $F_2$, and $F_3$ of a specified target in images $PP_1$ (the same as the image $P_1$), $PP_2$ (an image comprising the images $P_2$ to $P_5$), and $PP_3$ (an image comprising the images $P_6$ to $P_{14}$) photographed respectively by the cameras $C_1$, $C_2$, and $C_3$. The specified target refers to at least a portion of the target object to be displayed differently from other subjects, such as a portion of a person, a pet like a dog and a cat, or a vehicle. In this embodiment, the specified target refers to the face (hereinafter denoted by Fk) of a person S who is the target object to be displayed differently from other subjects in the field of view. FIGS. 6A to 6C respectively show exemplary results of detection by the detection unit 32 regarding the regions $F_1$ to $F_3$ representing the face Fk in the images $PP_1$ to $PP_3$.

As a method of detecting the regions of the specified target in the images, a method described in U.S. Patent Publication Application No. 20060098256 can be used, for example. In this method, a classifier to judge whether an object is a detection target is obtained in accordance with characteristic quantities, through learning in advance the characteristic quantities of pixels in a plurality of sample images representing a known detection target such as human face. By applying the classifier to the respective images $PP_1$, $PP_2$, and $PP_3$, the specified target is detected. In the case where the specified target is a person or the like moving in the field of view, a region of the moving object can be detected by finding a difference between an image of current frame and a previous image or previous images of preceding frame or frames. The specified target can then be detected by applying the classifier only to a region including the region of the moving object out of the entire image.

In addition, various kinds of known detection methods can be used for the detection. For example, a method described in Japanese Unexamined Patent Publication No. 2004-062604 may be used. In this method, a plurality of object regions are extracted from a target image, and the type of object is judged for each of the extracted object regions. By judging whether a degree of certainty regarding the type exceeds a predetermined threshold value, a detection target of an intended type is detected.

In the detection processing described above, the specified target is detected in each of the images. However, the detection target may be detected in at least one of the images. In this case, the specified target is obtained in each of the images based on a result of the detection in the image or images. For example, if how pixels representing the same subject correspond to each other is known among the respective images $PP_1$, $PP_2$, and $PP_3$, the specified target is detected in at least one of the images $PP_1$, $PP_2$, and $PP_3$. Based on the pixels in the remaining images, which correspond to the pixels in the region of the specified target having been detected, the specified target can be obtained in the remaining images.

In each of the images $PP_1$, $PP_2$, and $PP_3$, the region acquisition unit 34 obtains regions each comprising pixels having substantially the same relationships between degrees of blurriness as relationships between degrees of blurriness of the regions $F_1$, $F_2$, and $F_3$ representing the face Fk of the person S detected by the detection unit 32. The degree of blurriness can be found at each of the pixels in each of the images, by measuring spatial frequency components around the pixel. Blurriness degrees $y_1$, $y_2$, and $y_3$ of the regions $F_1$, $F_2$, and $F_3$ corresponding to the face Fk may be mean values or the like of the spatial frequencies in the respective regions.

Figure 7:
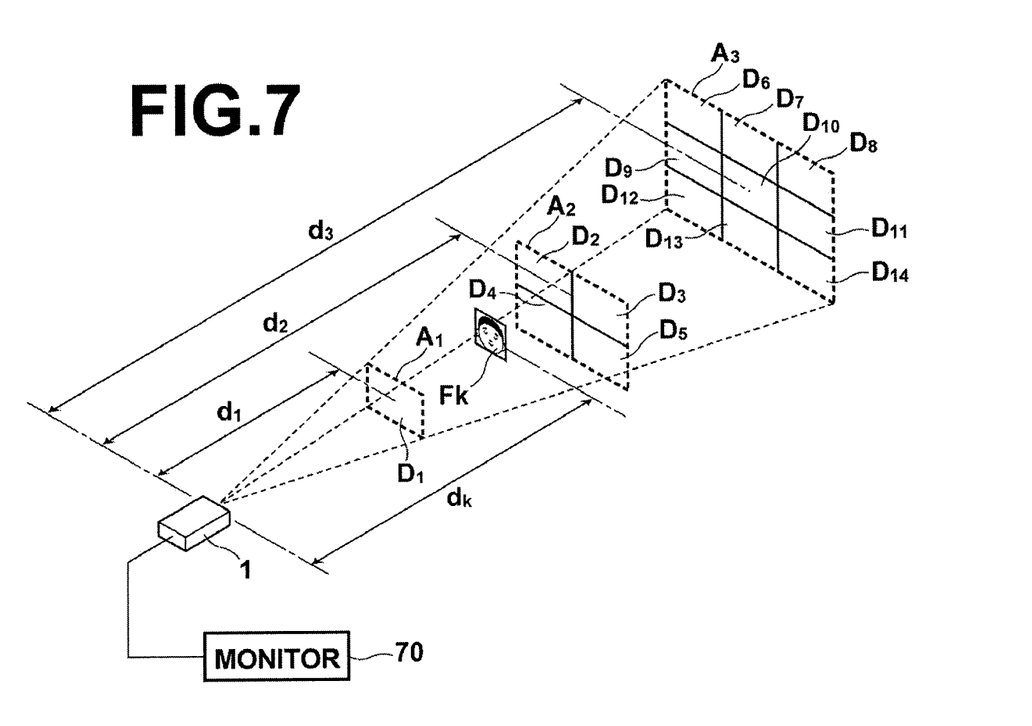
FIG. 7 is a schematic view showing the photography distance of the specified target in the region of FIG. 2.
Figure 8:
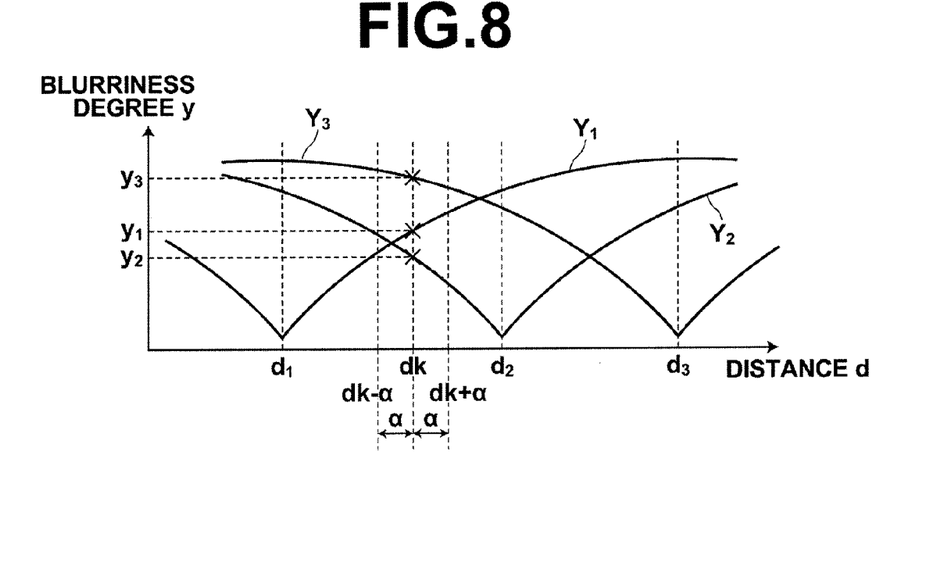
FIG. 8 is a graph showing relationships between degrees of blurriness and the distance of a subject photographed by respective cameras in FIG. 1.

FIG. 7 is a schematic view showing a distance dk from each of the cameras to the face Fk of the person S. FIG. 8 is a graph showing a relationship between a degree of blurriness of a subject in an image photographed by each of the cameras $C_1$, $C_2$, and $C_3$ whose in-focus distances are respectively denoted by $d_1$, $d_2$, and $d_3$ and a distance d to the subject from each of the cameras. As shown in FIG. 8, each of blurriness degrees $Y_1$, $Y_2$, and $Y_3$ becomes minimal in the corresponding image when the distance d of the subject from the corresponding camera agrees with the in-focus distance of the camera. The more the distance deviates from the in-focus distance, the larger the degree of blurriness becomes. Therefore, based on the graph shown in FIG. 8, the distance dk to the face of the person S from each of the cameras is found according to relationships between the degrees $y_1$, $y_2$, and $y_3$.

Thereafter, a distance range (from dk−α to dk+α) that wholly includes the person S is determined according to the distance dk. It is preferable for a size of the distance range to be determined according to a size of the person S. For example, the distance range is determined as a distance range of maximal possible size of the person S.

A range wherein the relationships between the degrees of blurriness correspond to the relationships in the determined distance range is then found from the graph shown in FIG. 8. The regions comprising pixels corresponding to each other to represent the same subject, in which the relationships between the blurriness degrees thereof agree with the relationships between the blurriness degrees within the determined range, are found in the respective images $PP_1$, $PP_2$, and $PP_3$. In other words, the regions representing the subject including the target object within the determined distance range are found in the respective images $PP_1$, $PP_2$, and $PP_3$.

In the case where the detection unit 32 has not found the face Fk of the person S, the region acquisition unit 34 determines a distance of the face estimated in a current frame by the estimation unit 38 as will be described later, as the distance dk to the face Fk of the person S. The region acquisition unit 34 then determines the distance range (from dk−α to dk+α) wholly including the person S, based on the determined distance dk. The region acquisition unit 34 obtains the regions of the subject within the distance range in the respective images $PP_1$, $PP_2$, and $PP_3$.

Even in the case where the detection unit 32 has detected the face Fk of the person S, if the distance to the face Fk obtained by the relationships between the blurriness degrees of the face Fk in the respective images is greatly different from the distance to the face Fk estimated by the estimation unit 38 in the current frame, the detection result obtained by the detection unit 32 can be erroneous. Therefore, the distance range may be increased so as to wholly include the person S with certainty, for example.

The estimation unit 38 estimates the distance to the face Fk from each of the cameras at the time of photography, based on the blurriness degrees of the face Fk of the person S in at least two immediately preceding images photographed serially by each of the cameras $C_1$, $C_2$, and $C_3$. More specifically, by using an optical flow or Kalman filter method or the like, the estimation unit 38 calculates a movement vector of the face Fk relative to each of the cameras, based on history of the distance to the face Fk detected by the detection unit 32 at the time of preceding photography. The estimation unit 38 then estimates the distance to the face Fk at the time of on-going photography, by using the movement vector.

Figure 9:
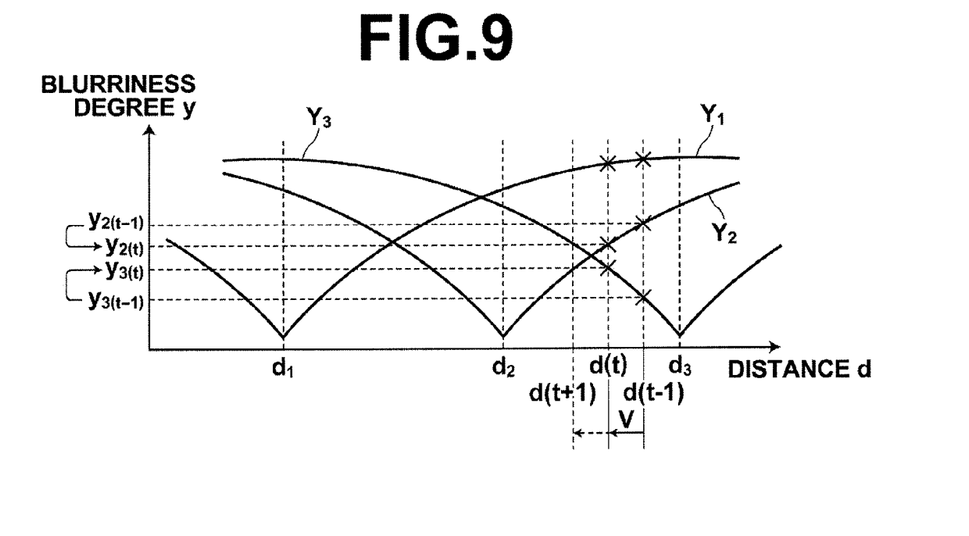
FIG. 9 is a graph showing how an estimation unit in FIG. 5 estimates the photography distance to the specified subject.

For example, as shown in FIG. 9, in the case where the degrees of blurriness of the face Fk at a time (t−1) in the respective images are $y_1(t−1)$, $y_2(t−1)$, and $y_3(t−1)$ while the degrees of blurriness of the face Fk at a time t in the respective images are $y_1(t)$, $y_2(t)$, and $y_3(t)$, a movement vector $V(d(t)−d(t−1))$ of the face Fk is calculated based on the relationships between the blurriness degrees at the respective times. By adding the movement vector V to the distance $d(t)$ of the face Fk at the time t, the distance $d(t+1)$ of the face Fk at a time (t+1) of subsequent photography is estimated.

Figure 10:
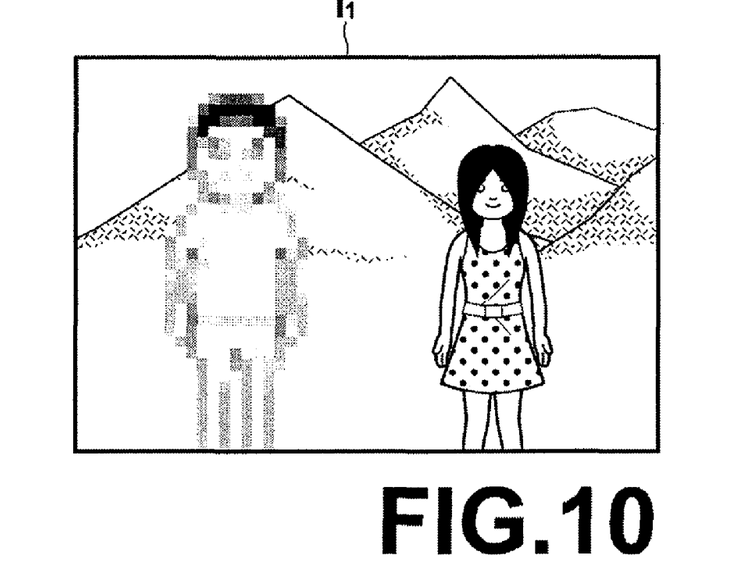
FIG. 10 shows an example of output image generated by an image processing unit in FIG. 5.
Figure 11:
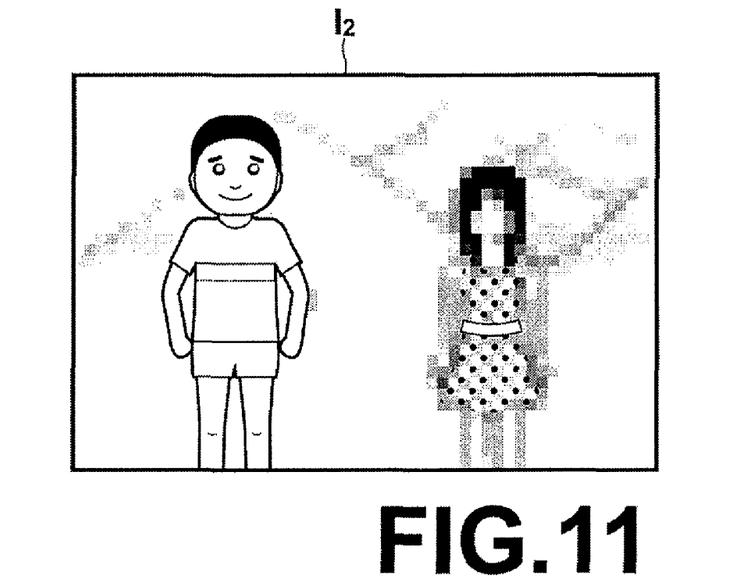
FIG. 11 shows another example of output image generated by the image processing unit in FIG. 5.

The image processing unit 36 carries out selection from the images $P_1$ to $P_{14}$ photographed by the photography modules $M_1$ to $M_{14}$, and composites the selected images. In addition, the image processing unit 36 carries out the image processing for displaying the regions obtained by the region acquisition unit 34 (that is, the regions wholly representing the person S in the images) in a manner different from other regions, in order to generate the output image I. For example, in order to generate the output image I having a predetermined photography target around the center thereof, the image processing unit 36 appropriately carries out selection from the images $P_1$ to $P_{14}$ and compositing of the selected images, and carries the masking processing such as region fill processing, mosaic processing, or template insertion processing on the regions obtained by the region acquisition unit 34 or regions other than the obtained regions. FIG. 10 shows an output image I1 resulting from mosaic processing carried out on the regions obtained by the region acquisition unit 34, while FIG. 11 shows an output image I2 resulting from mosaic processing carried out on regions excluding the regions obtained by the region acquisition unit 34.

Figure 12:
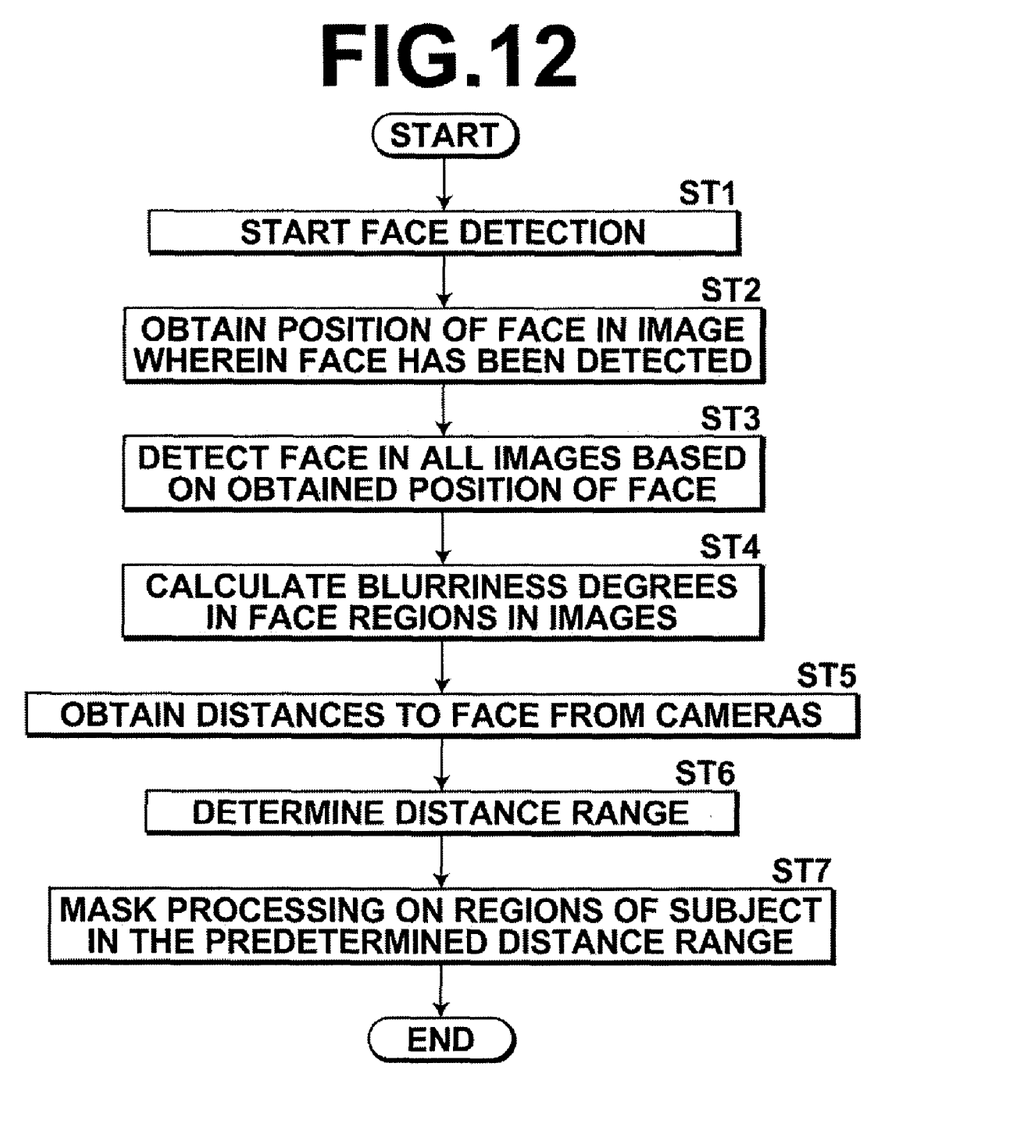
FIG. 12 is a flow chart showing an example of processing by the image compositing unit in FIG. 1.

An example of the processing carried out by the image compositing unit 30 will be described below, with reference to FIG. 12. The detection unit 32 starts the detection of the face regions $F_1$, $F_2$, and $F_3$ corresponding to the face Fk of the person S in the images $PP_1$, $PP_2$, and $PP_3$ (Step ST1). Upon detection of the face Fk in at least one of the images $PP_1$, $PP_2$, and $PP_3$, a position of the face Fk is obtained in the corresponding image or images (Step ST2). According to the position, the region or regions of the face Fk in the remaining image or images is/are found based on the correspondence between the pixels representing the same subject photographed in the respective images $PP_1$, $PP_2$, and $PP_3$ (Step ST3). The region acquisition unit 34 calculates the mean values of the spatial frequencies in the regions $F_1$, $F_2$, and $F_3$ corresponding to the face Fk, as the blurriness degrees $y_1$, $y_2$, and $y_3$ in the regions (Step ST4). Based on the graph shown in FIG. 8, the distance dk to the face Fk from each of the cameras is found according to the blurriness degrees $y_1$, $y_2$, and $y_3$ (Step ST5). The distance range wholly including the person S is then determined according to the distance dk (Step ST6). The image processing unit 36 generates the output image I by carrying out selection from the images and compositing of the selected images, as well as the masking processing for displaying the regions of the subject within the distance range determined at Step ST6 differently from other images (Step ST7). In this manner, the generated image I is stored in the storage unit 40, and displayed on the monitor 70 via the external interface 50.

In the embodiment described above, the distance to the face Fk from each of the cameras is obtained first based on the relationships between the blurriness degrees regarding the face Fk of the person S in the respective images, and the distance range (from dk−α to dk+α) that wholly includes the person S is determined according to the distance. The range showing the relationships between the blurriness degrees corresponding to the determined distance range is then obtained, and the regions comprising the pixels corresponding to each other to represent the same subject wherein the relationships between the blurriness degrees thereof agree with the relationships between the blurriness degrees within the determined range are found in the respective images $PP_1$, $PP_2$, and $PP_3$. However, without acquisition of the distance or the like to the face Fk from each of the cameras, a range having the relationships between the blurriness degrees causing the person S to be included wholly may be found directly from the relationships between the blurriness degrees of the face Fk in the respective images. In this case, regions comprising pixels corresponding to each other to represent the same subject wherein the relationships between the blurriness degrees become the relationships between the blurriness degrees within the determined range are found in the respective images $PP_1$, $PP_2$, and $PP_3$. The estimation unit 38 in this case may also directly estimate the degrees of blurriness of the face Fk in the respective images $PP_1$, $PP_2$, and $PP_3$ at the time of on-going photography, based on the degree of blurriness of the face Fk of the person S in at least two immediately preceding images photographed serially by each of the cameras $C_1$, $C_2$, and $C_3$.

The storage unit 40 is connected to the image compositing unit 30 and is to store the digital data of the composited image generated by the image compositing unit 30 in a state allowing reading and overwriting thereof. As the storage unit 40, a semiconductor storage device (memory) including a volatile memory such as an SRAM and DRAM and a non-volatile memory such as an EPROM, EEPROM, and a flash memory may be used. Alternatively, a recording medium such as a hard disc, an optical disc, a magnetic optical disc, a magnetic disc, and a magnetic recording tape may be used as the storage unit 40. Furthermore, a combination of these may also be used as the storage unit 40.

The control unit 60 controls each unit of the multi-focus camera apparatus 1, according to signals from an operation system that is not shown and from the units described above. For example, the control unit 60 determines the iris value data and the shutter speed data of each of the photography modules $M_1$ to $M_{14}$.

According to the embodiment described above, in the multi-focus camera apparatus 1 that photographs and displays the same region by the cameras $C_1$, $C_2$, and $C_3$ having the different focal lengths, the regions $F_1$, $F_2$, and $F_3$ representing the face Fk of the person S are detected in the images $PP_1$, $PP_2$, and $PP_3$ obtained by the respective cameras $C_1$, $C_2$, and $C_3$, and the regions comprising the pixels having substantially the same relationships between the blurriness degrees as the relationships between the blurriness degrees $y_1$, $y_2$, and $y_3$ of the detected face in the respective images are obtained in the images $PP_1$, $PP_2$, and $PP_3$. The image processing for displaying the obtained regions differently from other regions is then carried out. Therefore, based on the result of detection of at least a portion, that is, the face Fk in this case, of the person S to be displayed differently from other subjects such as a subject Q in FIG. 2, the regions of the subject in the distance range that wholly includes the person S are obtained, and the entire region of the person S in the composited image can be displayed differently from other regions.

Even in the case where the face Fk of the person S has not been detected occasionally, the degrees estimated from each of the degrees of blurriness of the face Fk in at least two immediately preceding images photographed serially by a corresponding one of the cameras are used as the degrees of blurriness thereof in the respective images. Therefore, the regions of the subject in the distance range that is highly likely to include the person S wholly can be displayed differently from other regions.

In the embodiment described above, the cameras each having at least one of the photography modules M and installed closely to each other have been described as an example of the cameras. However, the cameras may comprise a plurality of lens units having different focal lengths and installed next to each other, and a mechanism to convert a light from a subject having passed through each of the lens units into an image signal. The lens units may also be unified.

In the above embodiment, the image compositing unit 30, the storage unit 40, the external interface 50, and the control unit 60 are installed in the multi-focus camera apparatus 1. However, at least one of the units described above may be disposed outside the camera apparatus 1 as a separate unit or separate units.

The case has been described where the cameras $C_1$, $C_2$, and $C_3$ of the different focal lengths respectively have the photography module or modules M whose quantities are predetermined but different from each other. However, the quantities of the photography modules may be the same between the cameras as long as each of the cameras $C_1$, $C_2$, and $C_3$ has one or more of the photography modules M.

What is claimed is:

1. A multi-focus camera apparatus that photographs the same region by a plurality of cameras having different focal lengths, the camera apparatus comprising:

detection means for detecting a specified target in a plurality of images photographed by the cameras;

region acquisition means for obtaining, in the respective images, regions comprising pixels having substantially the same relationships between blurriness degrees as relationships between blurriness degrees regarding the specified target in the respective images detected by the detection means; and image processing means for carrying out image processing to cause the regions obtained by the region acquisition means to be displayed differently from other regions.

2. The multi-focus camera apparatus according to claim 1 wherein the blurriness degree regarding the specified target in each of the images is estimated from a blurriness degree of the specified target in at least two immediately preceding images photographed serially by a corresponding one of the cameras.

3. The multi-focus camera apparatus according to claim 1 wherein the image processing is at least one of region fill processing, mosaic processing, and template insertion processing.

4. The multi-focus camera apparatus according to claim 2 wherein the image processing is at least one of region fill processing, mosaic processing, and template insertion processing.

5. An image processing method for displaying the same region photographed by a plurality of cameras having different focal lengths constituting a multi-focus camera apparatus, the method comprising the steps of:

detecting a specified target in a plurality of images photographed by the plurality of cameras;

obtaining, in the respective images, regions comprising pixels having substantially the same relationships between blurriness degrees as relationships between blurriness degrees regarding the specified target detected in the respective images; and carrying out image processing to cause the obtained regions to be displayed differently from other regions.

6. The image processing method according to claim 5 wherein the blurriness degree regarding the specified target in each of the images is estimated from a degree of blurriness of the specified target in at least two immediately preceding images photographed serially by a corresponding one of the cameras.

7. The image processing method according to claim 5 wherein the image processing is at least one of region fill processing, mosaic processing, and template insertion processing.

8. The image processing method according to claim 6 wherein the image processing is at least one of region fill processing, mosaic processing, and template insertion processing.

9. A tangible computer-readable recording medium storing a program for displaying the same region photographed by a plurality of cameras having different focal lengths constituting a multi-focus camera apparatus, the program causing a computer to execute the procedures of:

detecting a specified target in a plurality of images photographed by the plurality of cameras;

obtaining, in the respective images, regions comprising pixels having substantially the same relationships between blurriness degrees as relationships between blurriness degrees regarding the specified target detected in the respective images; and carrying out image processing to cause the obtained regions to be displayed differently from other regions.

* * * * *